(12) United States Patent
Zhang et al.

(10) Patent No.: US 9,295,993 B2
(45) Date of Patent: Mar. 29, 2016

(54) FLUID SHOCKWAVE REACTOR

(71) Applicants: Xiaoding Zhang, Qinzhou (CN); Chuanzhong Zhang, Qinzhou (CN)

(72) Inventors: Xiaoding Zhang, Qinzhou (CN); Chuanzhong Zhang, Qinzhou (CN)

(73) Assignee: QINZHOU AURASOURCE TECHNOLOGY INC. (CN)

( * ) Notice: Subject to any disclaimer, the term of this patent is extended or adjusted under 35 U.S.C. 154(b) by 395 days.

(21) Appl. No.: 13/852,730

(22) Filed: Mar. 28, 2013

(65) Prior Publication Data

US 2013/0221141 A1 Aug. 29, 2013

Related U.S. Application Data

(63) Continuation of application No. PCT/CN2011/080281, filed on Sep. 28, 2011.

(30) Foreign Application Priority Data

Sep. 29, 2010 (CN) .......................... 2010 1 0298882

(51) Int. Cl.
*B02C 19/00* (2006.01)
*B02C 19/06* (2006.01)
(Continued)

(52) U.S. Cl.
CPC ............... *B02C 19/06* (2013.01); *B01F 5/0256* (2013.01); *B01J 3/08* (2013.01); *B01J 4/002* (2013.01); *B01J 19/2405* (2013.01); *B01J 19/26* (2013.01); *B02C 19/063* (2013.01); *B02C 19/065* (2013.01); *C01G 25/02* (2013.01); *C01G 39/06* (2013.01); *C09C 1/00* (2013.01);

(Continued)

(58) Field of Classification Search
CPC .... B02C 19/06; B02C 19/061; B02C 19/066; B02C 19/068
USPC .......................................... 241/5, 39
See application file for complete search history.

(56) References Cited

U.S. PATENT DOCUMENTS 6,789,756 B2 * 9/2004 Beliavsky .................. 241/5
7,237,732 B2 * 7/2007 Sawada et al. ............. 241/15
(Continued)

FOREIGN PATENT DOCUMENTS

CN 1032750 A 5/1989
CN 2598666 Y 1/2004
(Continued)

OTHER PUBLICATIONS

International Search Report Application No. PCT/CN2011/080281 Completed: Dec. 21, 2011; Jan. 5, 2012 2 pages.

*Primary Examiner* — Faye Francis
(74) *Attorney, Agent, or Firm* — St. Onge Steward Johnston & Reens, LLC (57) ABSTRACT

The present invention relates to a fluid shockwave reactor. The fluid shockwave reactor introduces laser resonance theory into the field of fluid physics. It consists of a shockwave resonance energy concentration device and at least one set of jet collision device. The shockwave resonance energy concentration device can enhance the shockwave strength produced during jet collisions; strengthen the ultrahigh pressure and cavitation effect of the shockwave field; it can also intensify physical and chemical effects on the processed materials. The fluid shockwave reactor can achieve ultrafine crushing on the fluid materials with lower energy consumption. Under certain technological conditions, the fluid shockwave reactor may also effectively catalytize the chemical reaction process on fluid materials.

19 Claims, 7 Drawing Sheets

(51) Int. Cl.
  *B01J 4/00* (2006.01)
  *B01J 19/24* (2006.01)
  *B01J 19/26* (2006.01)
  *B01J 3/08* (2006.01)
  *B01F 5/02* (2006.01)
  *C01G 25/02* (2006.01)
  *C01G 39/06* (2006.01)
  *C09C 1/00* (2006.01)
  *C09C 3/04* (2006.01)

(52) U.S. Cl.
  CPC ..... *C09C 1/0003* (2013.01); *B01J 2219/00162* (2013.01); *B01J 2219/00164* (2013.01); *B01J 2219/1942* (2013.01); *C01P 2004/62* (2013.01); *C09C 3/043* (2013.01)

(56) References Cited

U.S. PATENT DOCUMENTS

2003/0155454 A1\* 8/2003 Beliavsky ............... 241/5
2007/0200015 A1\* 8/2007 Sawada et al. ........... 241/5

FOREIGN PATENT DOCUMENTS

| CN | 201168576 Y | 12/2008 |
| JP | 2011516245 A | 5/2011 |
| WO | 2009121681 A1 | 10/2009 |

\* cited by examiner

FLUID SHOCKWAVE REACTOR

FIELD OF THE INVENTION

The present invention relates to an energy converter that makes use of a jet to generate shockwaves, especially to a fluid shockwave reactor that carries out an ultrafine crush treatment for fluid materials, or realizes catalytic treatment for chemical reactions of liquid materials.

BACKGROUND OF THE INVENTION

In the field of modern industrial production, mechanical equipments for carrying out an ultrafine crush treatment for fluid materials have been widely used, such as high pressure jet collision pulverizers, high pressure target jet pulverizers, high pressure homogenizers, etc. At present, in order to achieve ultrafine crushing effect of fluid materials, this type of equipment needs working pressure as high as 100-200 MPa or even higher. The dependence on an ultra high pressure leads to high energy consumptions in industrial productions, strict requirements on the equipment structure and equipment performance, high requirements on the particle size of fluid materials, and low levels of safety in industrial productions. The main problem within these devices lies in imperfection of their core structures. Part of the energy is released in void during processing, and therefore the crushing efficiency is reduced. As a result, without ultra-high voltage power, the ultrafine crushing effect of fluid materials can hardly be reached.

SUMMARY OF THE INVENTION

The fluid shockwave reactor according to the present invention, based on high pressure fluid crushing technology of all kinds in domestic and abroad, focused on the improvement of energy conversion efficiency, through innovative design of the core structure, has led to a highly efficient, energy saving converter.

This fluid shockwave reactor introduces laser resonance theory into fluid physics, by using the shockwave resonance energy concentration device, enhances the intensity of the shockwave produced in jet impinging process, strengthens the effect of ultrahigh pressure and cavitation in a shockwave field, and intensifies the physical and chemical effects on the treated materials. Mass number of tests and production practices have proved that, compared to various types of fluid shockwave crushers that rely on superhigh pressure, this new fluid shockwave reactor can achieve ultrafine crushing of fluid materials with lower energy consumption. Under certain conditions, this fluid shockwave reactor may also effectively catalytize the chemical reaction of fluid materials.

The present invention has broad applications in energy industry, chemical industry, building materials, food, medicine and other manufacturing areas.

The technical solution of the present invention is described as follows: The fluid shockwave reactor consists of a shockwave resonance energy concentration device and at least one set of jet collision device. The jet collision device is composed of two sets of coaxial and opposite nozzle parts, each of which has the same nozzle. The shockwave resonance energy concentration device is a chamber combined with rigid spherical concave surfaces or other rigid convergent surfaces which are able to reunite the shockwaves emitted from a focus and converge them back to the focus to produce new shockwaves. This chamber has a jet orifice (201, in FIGS. 1-3) that holds the nozzle parts and a discharge port that permits outflow of the processed fluid from the chamber. A mid-point between the two nozzles is the location where jet collisions occur, and is disposed at the center of the spherical concave surfaces or the focus of all combined convergent surfaces. The sum of the cross-sectional area of the discharge port is much greater than the total cross-sectional area of all of the nozzles, and the cross-sectional area of the discharge port and the position where the discharged port is placed can keep fulfillment of the processed fluid materials within the chamber when the fluid shockwave reactor is at work.

For example, the ratio between the sum of the cross-sectional area of the discharge port and the total cross-sectional area of all of the nozzles could be 10:1, 100:1, or 1000:1 so as to form enough pressure drop when a high pressure fluid injects through the nozzles, and therefore the jet is accelerated sufficiently.

The aforementioned combined convergent surfaces include at least one convergent concave surface, and can also include reflection plane(s) or convex surface(s). The concave surface can be a parabolic or spherical concave surface. In the description, the technical feature "a chamber combined with rigid spherical concave surfaces or other rigid convergent surfaces which are able to reunite the shockwaves emitted from a focus and converge them back to the focus to produce new shockwaves" may include other subordinate parts which do not participate convergent reflections in producing shockwaves but play a supporting role in making it "keep fulfillment of the processed fluid materials within the chamber when the fluid shockwave reactor is at work" as components of the chamber wall except for rigid spherical concave surfaces or other rigid convergent surfaces which are able to reunite the shockwaves emitted from a focus and converge them back to the focus to produce new shockwaves".

Beneficial effects of the fluid shockwave reactor are as follows: The fluid shockwave reactor according to the present invention, focused on flowing characteristics of fluid, takes the optical resonator principle as reference and is designed a chamber structure of the fluid shockwaves. This resonant chamber structure can gather the shockwave energy produced by strong turbulence when opposite jets collide, through reflection and aggregation caused by confocal reflection chamber with different radius of curvature and intervals or caused by reflective chamber with concentric spherical concave. The turbulent area around the chamber structure forced the energy density within the shockwave radiation field raised enormously, and the materials passing through the chamber are stimulated by chamber resonance and in turn materials are ultrafine crushed. Under the condition of same power input, compared with the ordinary jet collision device, the resonant chamber structure can effectively improve the efficiency of conversion, greatly improve the treatment effect. Besides ultrafine crushing of fluid material, this fluid shockwave reactor can also play a catalytic role in the chemical reaction process of liquid materials.

DETAILED DESCRIPTION OF THE INVENTION

Figure 1:
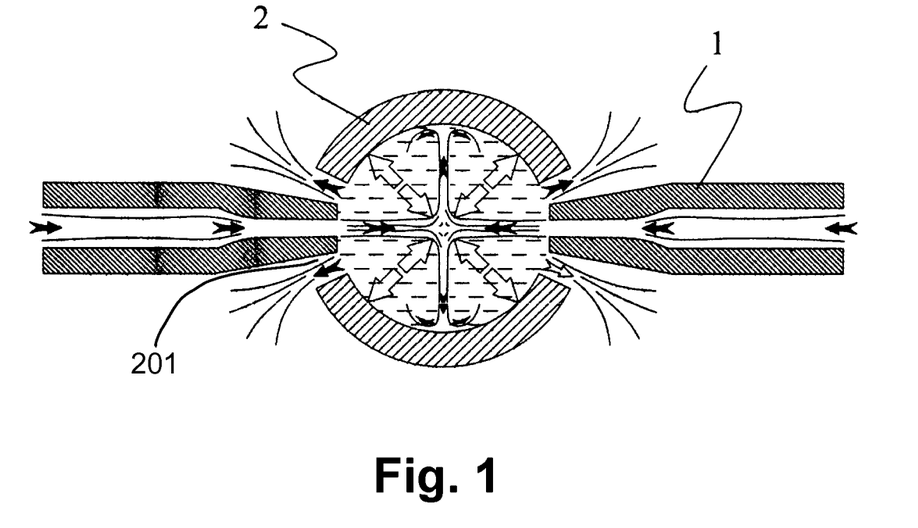
FIG. 1 is a schematic of operational principles of the fluid shockwave reactor; the solid arrows indicate fluid flow paths, and the hollow arrows represent transmitted ways of shockwaves.
Figure 2:
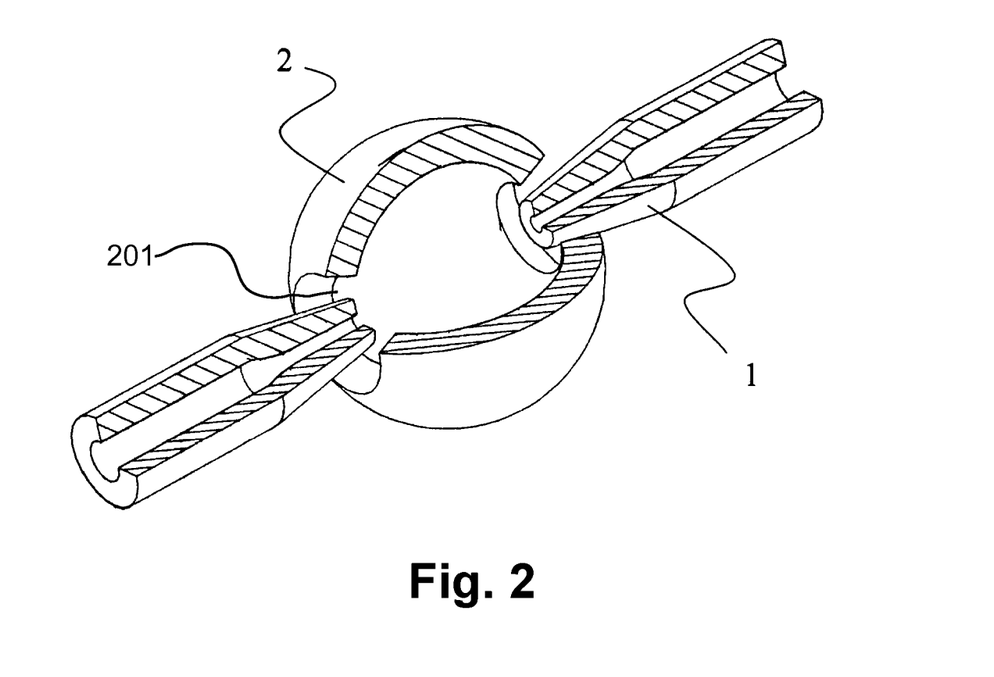
FIG. 2 illustrates the main structure of the fluid shockwave reactor composed of one set of jet collision device and one rigid ball-shaped indented surface.

As shown in FIGS. 1-2, take the spherical indentation as a reflection surface of the shockwave resonance energy concentration device as an example, the operational principles of the fluid shockwave reactor are as follows: A fluid which has passed through the high pressure pump flows out from two nozzles 1 at a speed of hundreds m/sec or even km/sec and collides at the connection middle point, and in turn results in self-excited vibration and then forms shockwaves. As the fluid changes its movement direction, it forms a disc-shaped scattering jet having a center located at the collision point, and eventually flows out of the chamber through a discharge port. The shockwaves diffuse outwardly in the fluid filled in the chamber, relect when reaching the chamber wall formed by a rigid ball indentation 2, reunite and strengthen at a focus position, and then overlap with the primary waves produced there. This process recycles to form oscillatory waves. Under a relatively stable jet pressure, the shockwaves continuously strengthen, thereby forming a very strong resonance shockwaves. The strong resonant shockwaves alter between instantaneous high pressures and cavitation effects, which in turn has strong physical and chemical effect on the fluid material therein. When dealing with the fluid material, this is the exact reason why the fluid shockwave reactor shows better physical and chemical effect than pure jet collision device generally does.

Based on different application examples of the device, the pressures imposed by the high-pressure pump usually ranges between 5-100 MPa, commonly ranges between 1 to 30 MPa.

Figure 3:
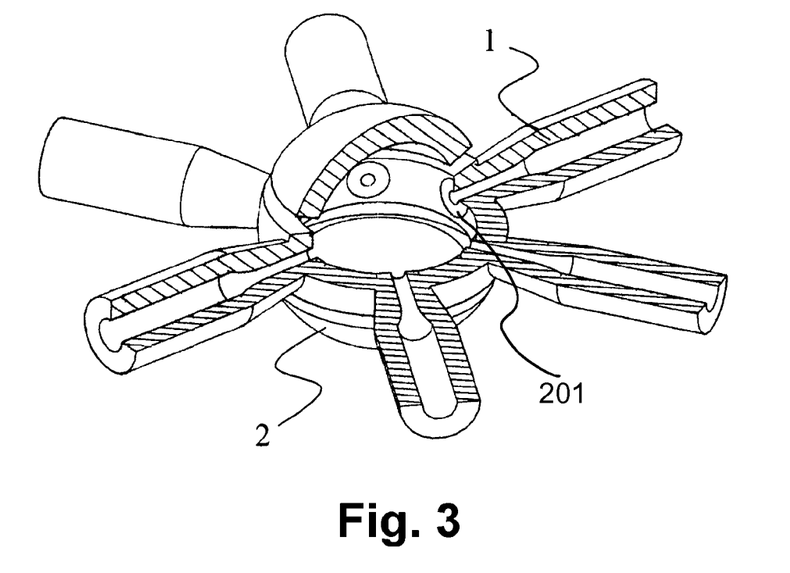
FIG. 3 illustrates the main structure of the fluid shockwave reactor composed of three sets of jet collision devices and two rigid ball-shaped indented surfaces.
Figure 4:
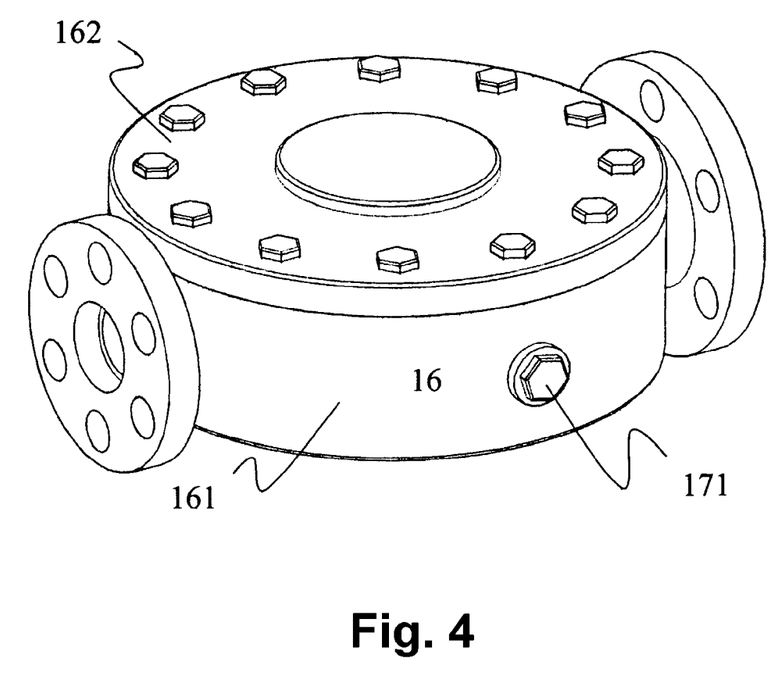
FIG. 4 is a perspective schematic view of the shockwave reactor with a single set of collision jet.
Figure 5:
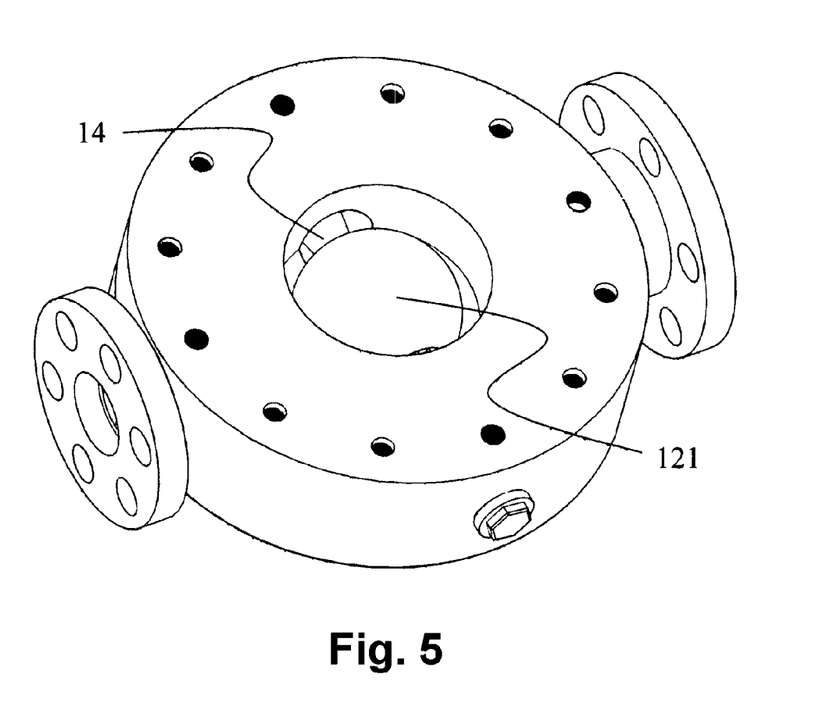
FIG. 5 is a perspective schematic view of the shockwave reactor with a single set of collision jet, in which a top cover is removed.
Figure 6:
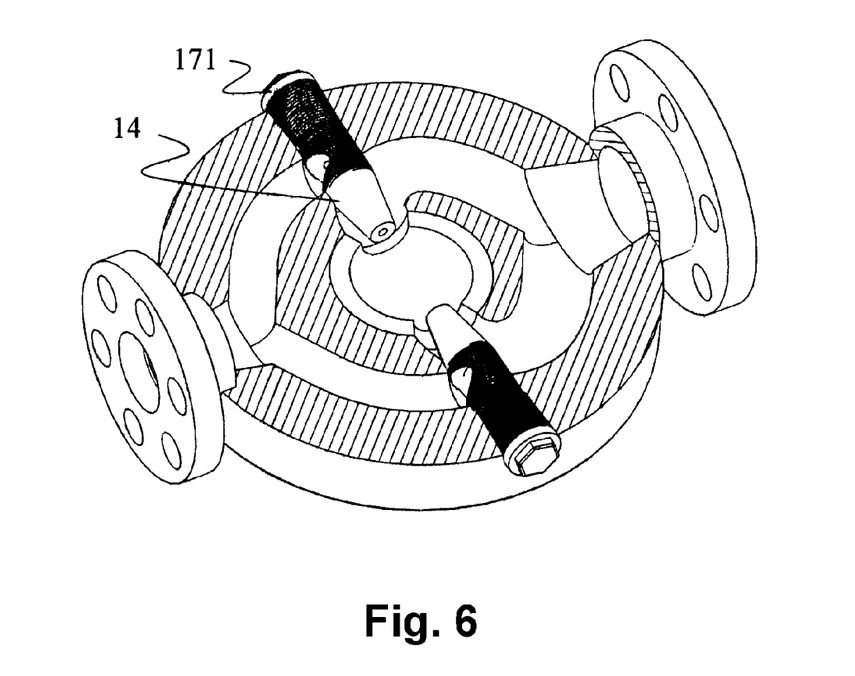
FIG. 6 is a perspective schematic view of the shockwave reactor with a single set of collision jet, in which an outer shell is cut open and an upper part is removed.
Figure 7:
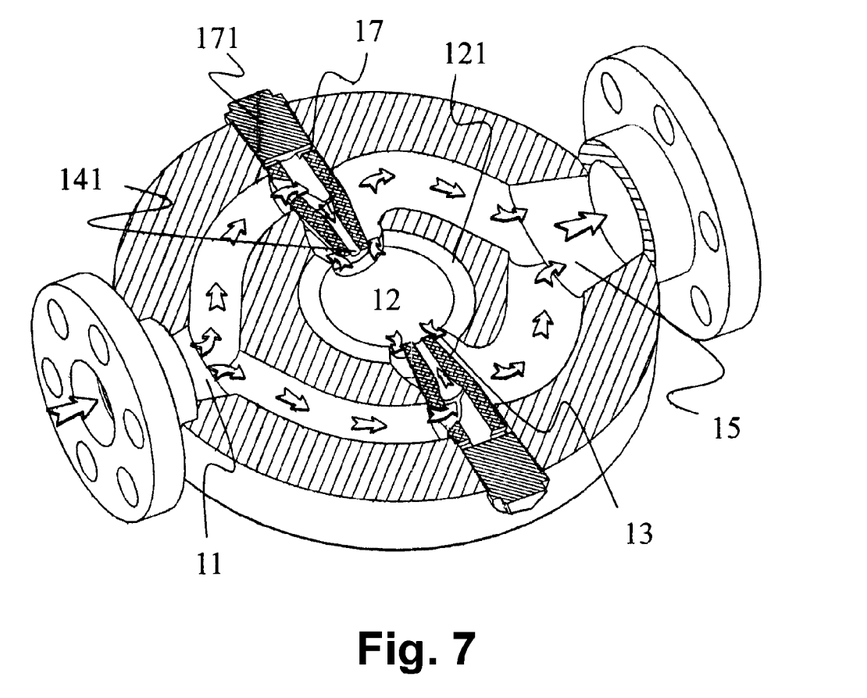
FIG. 7 is a perspective schematic view of the shockwave reactor with a single set of collision jet, in which an outer shell, nozzles and their lids are cut open and an upper part is removed. In this figure, arrows show the flowing path of materials.
Figure 8:
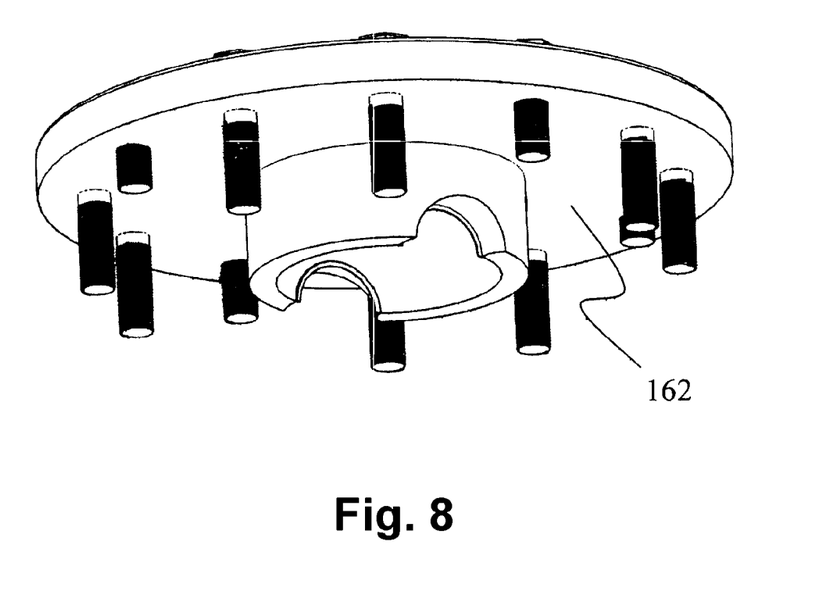
FIG. 8 is a perspective schematic view of the upper cover and bolts of the shockwave reactor with a single set of collision jet.

As shown in FIG. 3, when the fluid shockwave reactor is provided with more than one jet collision devices, its nozzles can be distributed in one plane, or in a space, but the positions of the nozzles should avoid the locations of the disc-shaped scattering jets generated by other colliding jets, namely the nozzle axes are not vertical to each other, otherwise interference between the jet flows and scattering flows will reduce the reaction effect.

According to the principle of laser resonator, it is possible to generate waves from one point and then converge them to the point so as to form a concave surface of shockwaves or combinations of concave surfaces, such as a spherical concave surface, two opposite paraboloids which are confocal and coaxial, and some curved surface combinations which include at least one convergence concave surface and combinations of flat surfaces and convex surfaces. For spherical reflection concave surfaces, the waves emitted from the center converge back there after one reflection. For two opposite paraboloids which are confocal and coaxial, waves emitted from the confocal converge back there after two reflections. For the curved surface combinations having flat surfaces and convex surfaces, due to the limitation of fluid and the complexity of structure, it belongs to a secondary or unfavorable plan in the present invention, and no further discussion herein.

Since the fluid within the chamber stays in a flow state when the fluid shockwave reactor is at work, the propagation direction of the wave is, in a certain extent, affected by the flow of medium. Therefore, there could be a deviation between the best focal point after the shockwave reflection and the geometric focus of the convergence concave, and the shockwave resonance device of the reactor shall have a certain shape for making adjustment in an extent, i.e., its shape slightly deviates from a standard spherical concave surface or paraboloid, but still called as spherical concave surface and paraboloid.

The aforementioned fluid, fluid material or processed fluid can be a continuous phase of a liquid material, and can also be a continuous phase of a gas material, the only point being that shockwaves differ in gas medium and liquid medium with respect to energy transfer efficiency and physical and chemical effect. Therefore, if not specified otherwise, fluid, fluid material or processed fluid refer to a continuous phase of a fluid material, as follows.

The present invention is further explained with reference to the following preferred embodiments.

EXAMPLE 1

Shockwave Reactor with a Single Set of Collision Jet

The outer shell of the fluid shockwave reactor device is made of metal materials or high-polymer synthetic materials having a high strength; the nozzles and reflection energy convergence cover are made of a metal material having a high hardness, a ceramic material having a high strength or a metal-ceramic composite material.

1. Feeding channel 11;
2. Spherical resonance chamber 12, which is a hollow chamber formed by a rigid ballconcave surface, the spherical resonance chamber 12 of this example is surrounded by two hollow half-spheres 121, which are reflection energy convergence covers. The spherical resonance chamber can also be made into an integral structure in accordance with practical demands;

3. Discharge port 13, located at the two sides of the reflection energy convergence cover are a jet port and a discharge port, they are located in the same place, herein referred to as discharge port.

4. Nozzle 14, two nozzles 14 are communicated respectively with feeding channels 11 which are divided into two ways. The nozzles are located between the two discharge ports 13 and are coaxially positioned. The midpoint of the nozzle ports 141 of the nozzles 14 coincides with the center of spherical resonance chamber 12. The two discharge ports 13 are communicated respectively with the discharge channel 15, and gather into one way. The jet components stated earlier are nozzles 14 in this example;

5. Discharge channel 15;

6. Outer shell 16, all the aforementioned structures are disposed inside an outer shell which can resist a high pressure. The tube walls of the feeding channel 11 and the discharge channel 15 are integrally formed with the outer shell. The outer shell is divided into a shell 161 and an upper cover 161, with several sealing bolts connected in between; the reflection energy convergence cover can be assembled or replaced by opening the upper cover.

7. Nozzle assembly holes 17, which are disposed on both sides of the shell; Nozzle 14 is threaded and disposed inside the nozzle assembly holes 17, and nozzle caps 171 are disposed outside the nozzle assembly holes 17, and sealingly connected with the nozzle assembly holes 17 by screw threads. By changing the nozzles having different diameters, the fluid shockwave reactor can be switched on different application need requiring different working pressures or working flows.

The outer shell of the fluid shockwave reactor device is made of metal materials or high-polymer synthetic materials having a high strength; the nozzles and reflection energy convergence cover are made of a metal material having a high hardness, a ceramic material having a high strength or a metal-ceramic composite material.

The operational principle of the shockwave reactor with a single set of collision jet is as follows: The fluid material with a certain pressure provided by the fluid power equipment goes through a feed channel and outflows respectively from two nozzles and collides at their midpoint. It produces shockwaves and changes the direction, forms the disc-shaped scattering flow at the midpoint between the nozzles. After hitting the reflection energy convergence cover, the flow goes towards the discharge port, and eventually passes through the discharge hole; the flow converges through the discharge channel streams all the way and discharges out of the shockwave reactor, so as to complete the process.

The features and the beneficial effects of the example are as follows:

This example is a fluid shockwave reactor having a relatively simple structure, low manufacturing cost, easy to assemble, suitable for the breakage of particle within fluid or other physical and chemical processing, working particularly well at low demanding workflows per unit time.

EXAMPLE 2

Shockwave Reactor with Multiple Sets of Collision Jets

Figure 9:
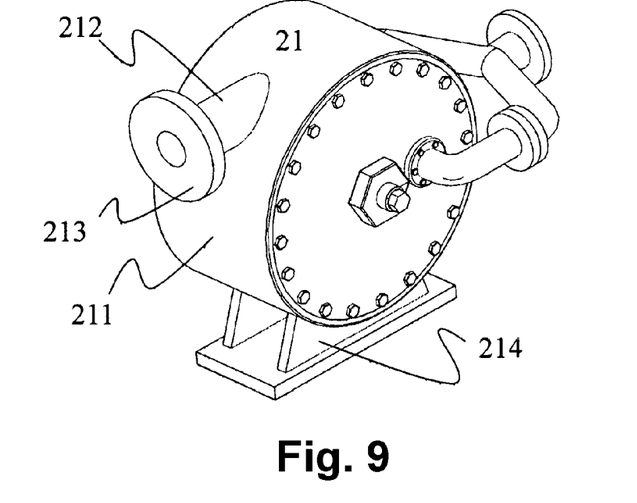
FIG. 9 is a perspective schematic view of the shockwave reactor with multiple sets of collision jets.
Figure 10:
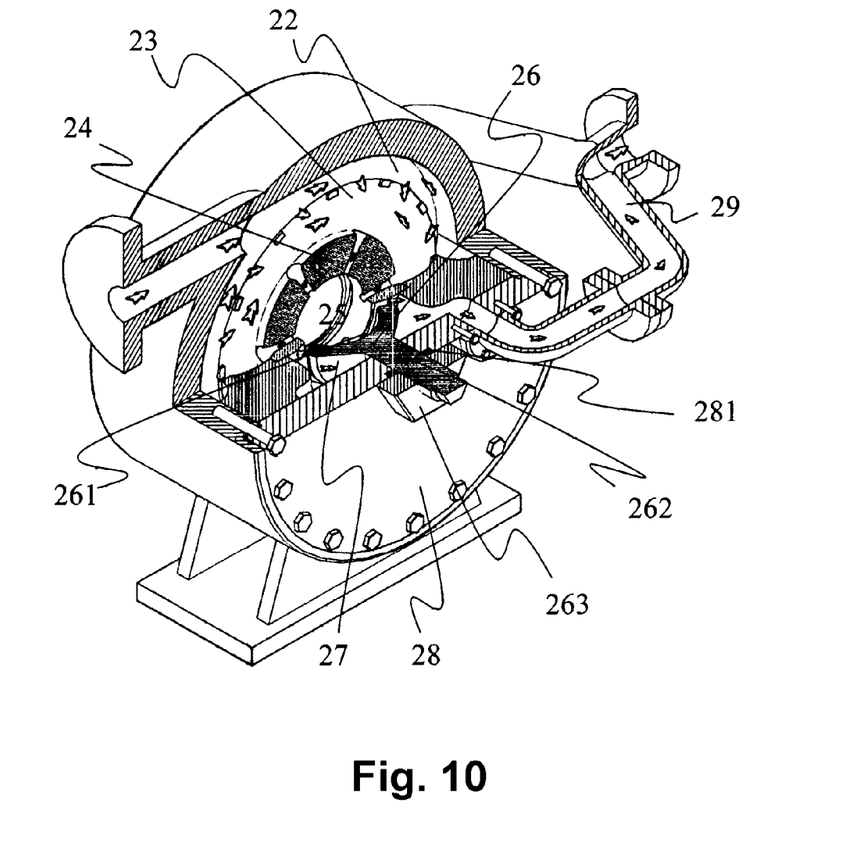
FIG. 10 is a perspective schematic view of the shockwave reactor with multiple sets of collision jets, in which some parts is cut open and removed. In this figure, arrows show the flowing path of materials.
Figure 11:
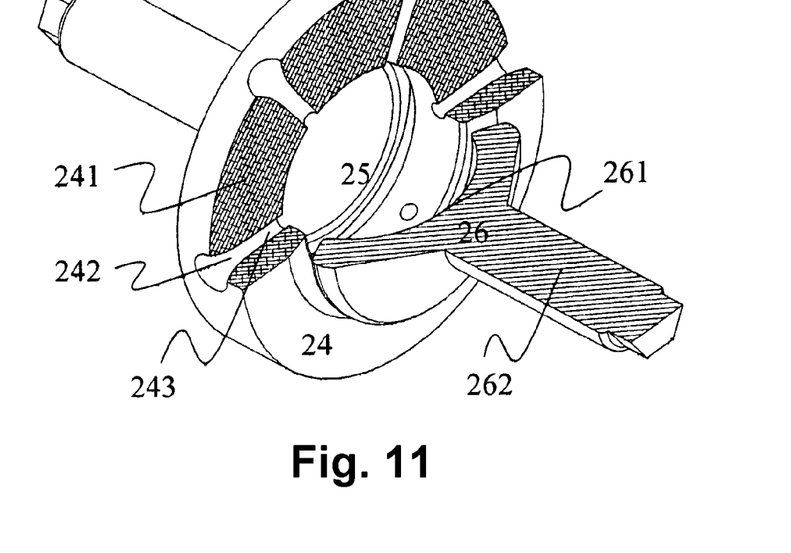
FIG. 11 is a perspective schematic view of the resonant energy concentration device and nozzles of the shockwave reactor with multiple sets of collision jets, in which some parts are cut open and removed.
Figure 12:
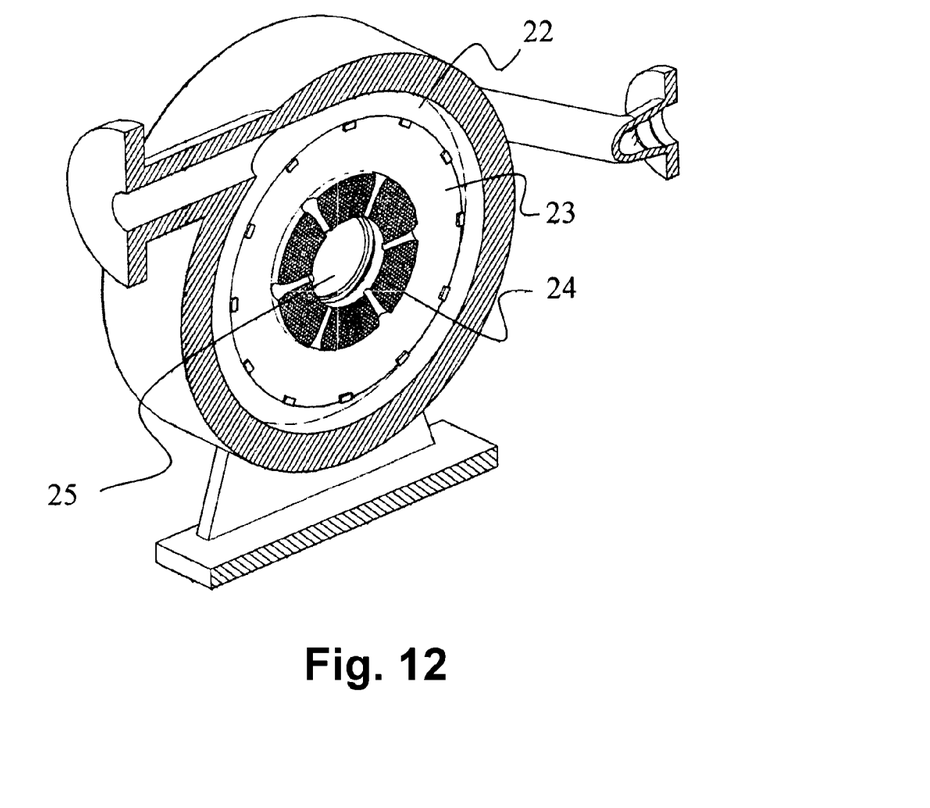
FIG. 12 is a perspective schematic view of the shockwave reactor with multiple sets of collision jets, in which the front structure is vertically cut open along a middle symmetrical plane and removed.
Figure 13:
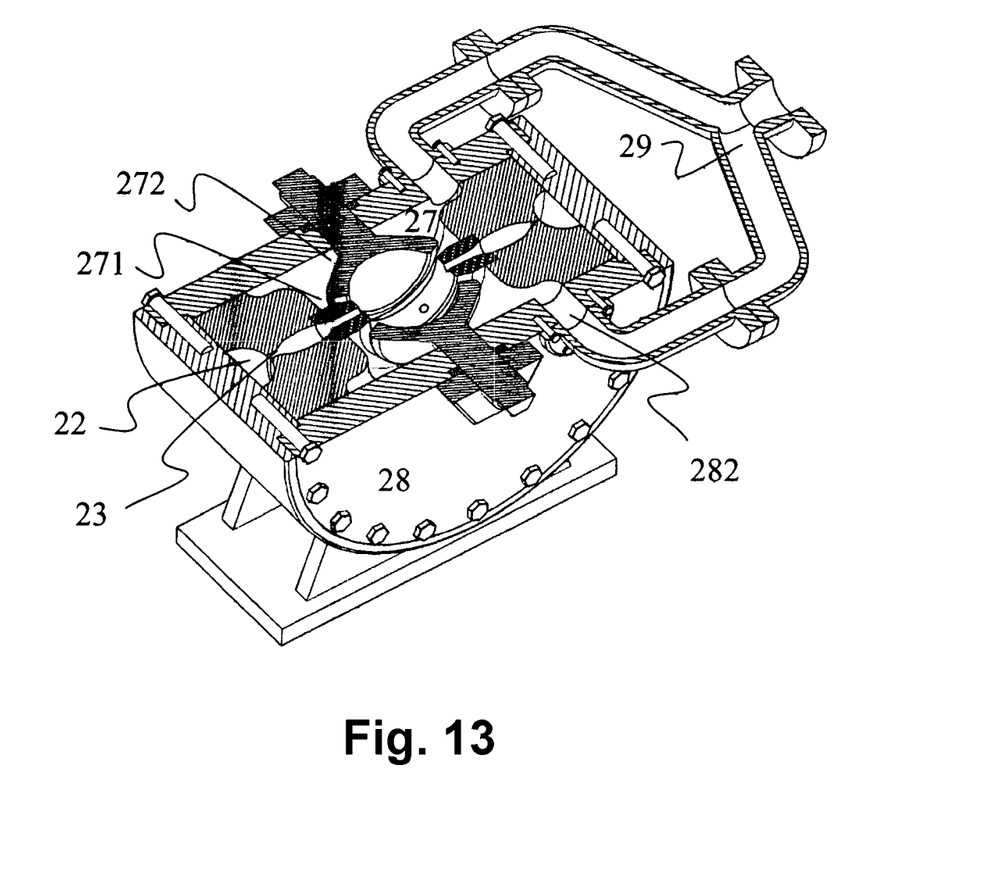
FIG. 13 is a perspective schematic view of the shockwave reactor with multiple sets of collision jets, in which the front structure is cut open along a horizontal plane at the center of the confocal chamber and removed.

As shown in FIGS. 9-13, the shockwave reactor with multi-sets collision jets is consists of:

1. Feeding channel and outer shell 21, as shown in FIG. 9, which are composed by a shell 211, a feeding pipe 212, a flang 213 and a support 214. The feeding channel is communicated with the vortex-type feeding chamber in a tangential direction, its cross-sectional area is much larger than the total cross-sectional areas of all the nozzles;

2. Vortex-type feeding chamber 22, as shown FIGS. 10, 12, and 13, which is located inside the shell, and has a circular shape;

3. Slotted self-servo diversion chamber 23, as shown in figures 10, 12, and 13, which is located inside the vortex-type feeding chamber 22. The inner wall of the chamber is formed by symmetrical revolving curves. The slot spacing is less than the minimum diameter sizes of the acceleration channel 242 and the nozzles 243;

4. High pressure sealed nozzle component 24, as shown in FIGS. 10, 11, 12, and 13, which includes a main body 241, an acceleration channel 242, and nozzles 243, and is located at the center of the shockwave reactor, inside the slotted self-servo diversion chamber 23. In this example, the high pressure sealed nozzle components are three pairs of nozzles arranged evenly on the same plane, the angle between each pair is 60°. The aforementioned nozzle components in this example, are an acceleration channel 242 and nozzles 243;

5. Symmetric coupled confocal resonance chamber 25, as shown in FIGS. 10, 11, 12, and 13, which is located inside the high pressure sealed nozzle components 24, between two curved reflection chambers 261. The symmetric coupled confocal resonance chamber is a resonant chamber that has two symmetrical parabolic coaxial with overlayed focus. In this example, high pressure sealed nozzle components 24 also constitute a part of the chamber wall;

6. Symmetric torque variable frequency tuning components 26, as shown in FIGS. 10, 11, and 13, which include a curved reflection chamber 261, an adjustment screw 262 and an adjustment nut 263. The surface reflection chamber 261 is perpendicular to the axis of the reactor and disposed to be opposite thereto. The adjustment screw 262 is disposed in the center of the sealed end-cover 28. 281 is a sealing ring, and adjusts the adjusting screw to switch the reflection chamber outward or inward; it also adjusts the resonant chamber to reach the best resonant effect. The adjustment nut 263 is used to fasten the adjustment screw 262 and compress the sealing ring 281. The surface of curved reflection chamber 261 is parabolic;

7. Symmetric coupled deceleration passage 27, as shown in FIGS. 10 and 13, which is constituted by a guiding groove 271 and a pressure reduction chamber 272, symetrically located on both outer sides of the symmetric coupled confocal resonance chamber 25, communicated respectively with the symmetric coupled confocal resonance chamber 25 and material diversion ports 282 on both sides of the sealing end-cover 28.

8. Sealing end-covers 28, as shown in Figures 10 and 13, which are symmetrically positioned outside the pressure reduction chamber 272, fixed by bolts on a sealing shell platform of the outer shell 21 through the support 214. The center of the end-cover and the curved reflection chamber are threaded connected by adjustment screw 262; and a sealing ring 281 is installed, the material diversion port 282 is disposed at its periphery;

9. Discharging channel 29, as shown in FIGS. 10 and 13, which is divided into two ways, and on both sides of the sealing end-covers 28 connected to the material diversion port 282 thereof; the inner diameter of the discharge channel is not less than that of the feeding port;

Outer Shell 21 can withstand pressure of 30 MPa and above. Its appearance is a metal container with shape of round or square, or polygon. A data collection module can be disposed at the feeding channel and the discharging channel. The data collection module includes a sample collection channel, a pressure sensor, a granularity tester, a flow meter, etc.

The spherically concave resonance chamber can also be used as the aforementioned symmetric coupled confocal chamber.

The outer shell of the fluid shockwave reactor is usually made of metal materials, and can also be made of macromolecular synthetic materials having a high strength; its internal parts can be made of metal, ceramic, macromolecular synthetic materials, or combination of the above. To make high pressure sealed nozzle components and curved reflection chamber, high-strength wear-resisting ceramics is preferred.

The operation principle of the shockwave reactor with multi-sets of collision jet is as follows:

The fluid material provided by fluid power equipment under a certain pressure, goes through a feeding channel into the vortex-type feeding chamber, and then into the slotted self-servo diversion chamber, deliveries to an accelerate channel continuously and evenly, and at last forms a jet at high speed and enters into the inner chamber of the fluid shockwave reactor. When multiple high-speed jet beams collide in the reactor, and form intense turbulent jets, strong self-excited vibrations and shockwaves are produced. The geometric structure of the reflection wall inside the resonant chamber can accumulate energy, and build a vibration system with the resonant chamber structure. In this process, the fluid is not only a vibration body that produces vibrations, but also a carrier that transmits vibrating waves; the fluid medium is stimulated to generate shockwaves. When the relative velocity of the jet beams, the reflection wall radius of the resonant chamber of the fluid shockwave reactor, and the length of the chamber, are harmonized with the frequency of the shockwaves, these waves will create repeated shocks between the reflection walls of the resonant chamber, the amplitude of the shockwaves will increase incessantly. When the shockwaves reach a certain energy intensity and frequency close to the resonant frequency of the fluid material in the reactor, resonance of the fluid happens. As a result, the solid particles of the fluid entered into the fluid shockwave reactor undergo crushing effects such as fluid substances in solid particles into the fluid besides shear force crushing effects; its nucleus structure can be broken by the shockwaves. Shockwave energy can even crack links between molecules of molecular mass within the fluid material. The multiple energy amplification process, can realize the ultrafine crushing of fluid material. Meanwhile with the occurrence of catalytic conditions such as rapid heating, high frequency resonance, high-speed collision and shearing, under certain technological conditions, the fluid can undergo physical and chemical changes instantly during the same process.

The features and the beneficial effects of the shockwave reactor with multi-sets collision jet are listed as follows:

1. By using a symmetric confocal coupled resonant chamber, the reactor adjusts symmetrical torque frequency tuner for tuning and forming the shockwave radiation field.

2. In order to retrieve a higher flow collision speed, it is required to retain a certain distance between the nozzle distance and the nozzle aperture diameter. As regards the shockwave reactor with a single set collision jet, in order to improve working efficiency and increase working flow rate, it is necessary to enlarge the nozzle aperture diameter, and thus increase the distance between the nozzles. The chamber volume shares a direct ratio with three times of the nozzle distance. Increased distance between the nozzles must cause considerable enlargement of the resonant chamber, and a huge increase of affecting space of shockwaves, resulting in serious energy dispersion and reduced efficiency. The multi-sets collision jets, however, can decrease the size of each pair of jet nozzles, and thus increase working flow rate of the device within limited space, and improve the efficiency of the single equipment.

3. Directing at different materials, different processing technologies, and different working flow rates, one can adopt high pressure sealing nozzle components with different nozzle numbers, nozzle aperture diameters, etc., and reflection chambers having different focal lengths.

4. The vortex-type feeding chamber is used in this example, it can divert the feeding fluid along the inner walls of the reactor, overcome the chaotic turbulence in the feeding chamber, solve uneven feeding or congestion problem caused by accumulation of the fluid material formed by slow flowrate.

5. Slotted self-servo diversion chamber is used in this example, it can restrict particles bigger than the given diameter of jet channel from entering into the diversion chamber, overcome the fluid channel congestion problem. The inner wall of the chamber with symmetrical curves, capable of keeping steady flows, can smooth the fluid material, and make it enter the acceleration passage evenly and in order.

6. The symmetric coupled deceleration passage is used in this example, it guides the fluid material crushed in the resonant chamber. The fluid propelled with vibration by continuous material coming into the chamber; it flows orderly into the pressure deduction chamber following symmetric coupled deceleration passage. This function can effectively reduce the disturbance effect of this part fluid material on the inward jet beams within the chamber and on the reflected jets in the reflection chamber, so as to ensure stable working condition in the reactor chamber.

The applications of the fluid shockwave reactor according to the present invention are listed below:

1. Experiment to Improve the Solubility of Nimodipine in Alcohol

To a medical fluid shockwave reactor with a power of 15 kw/h, a flow rate of 2.5 $m^3$/h is employed to treat Nimodipine and alcohol mixture under a pressure of 20 MPa. Compared with the comparative sample, solubility of Nimodipine in alcohol increases more than 195 times or above. Therefore, to dissolve the same dose, the amount of alcohol can be reduced greatly. This can effectively control the physiological stimulation when using this kind of antihypertensive drugs.

2. Ultrafine Treatment On Zirconium Dioxide

By employing the specified fluid shockwave reactor with a power of 22 kw/h, a flow rate of 2.5 $m^3$/h, and a working pressure of 20 MPa, the zirconium dioxide pulp with a size of −5 μm can be grinded to an ultrafine pulp with a size of −800 nm.

3. Ultrafine Treatment on New Coal Water Slurry

To carry out three levels of ultrafine treatment on coal water slurry, and turn the coal granular size of feeding slurry at −700 μm with average particle size at 64 μm to granular of ultrafine slurry at −25 μm with average particle size at 3.8 μm, the fluid shockwave reactor with a power of 110 kw/h, a flow rate of 10 $m^3$/h, a working pressure of 18-20 MPa is used. After a first level treatment, the coal granular of feeding slurry at −700 μm with an average particle size at 64 μm is decreased to the granular of the ultrafine slurry at −200 μm with an average particle size at 64 μm. Compared with the conventional coal water slurry production technology, this device can produce ultrafine coal water slurry under a relatively low energy consumption. If it is used to produce ordinary coal water slurry, then the energy consumption could be saved by 30% and above, and the technical specifications such as rheological property and stability of the coal water slurry, are improved greatly.

4. Amelioration on Mellowing Process of Liquor Products

To treat the ordinary liquor, the medical fluid shockwave reactor with a power of 15 kw/h, a flow rate of 2.5 m³/h, and a working pressure of 20 MPa is employed. Compared with comparative samples, the molecular group of liquor turned smaller after the treatment of the fluid shockwave reactor (Oxygen 17 of nuclear magnetic resonance: 90 Hz in original samples, and 59 Hz after treatment). Therefore, this process can effectively improve the activity of water molecules and ethanol molecules, improve their degree of association. The catalytic condition in the process has the volatilization effect on acrolein, hydrogen sulfide, etc., in the liquor. The fermentation process generally requires several months or even years to finish the microscopic chemical reaction, and can be reached instantaneously in this treatment. For the treated liquor, alcohol content is constant, the color is glittering, the aroma is pure and strong, and taste is soft and fruity.

5. Superfine Processing Experiment on Molybdenum Disulfide

To carry out superfine process on molybdenum disulfide, the fluid shockwave reactor at a power of 15 kw/h, a flow rate of 2.5 m³/h and a working pressure of 20 MPa is used. It can turn the granularity of molybdenum disulfide from −3 μm to superfined granulars of −600 nm.

What is claimed is:

1. A fluid shockwave reactor comprising:
a shockwave resonance energy concentration device comprising a chamber having a rigid spherical concave inner surface, and
at least a pair of coaxial and opposite nozzles for injecting a fluid material into said chamber with an initial pressure,
wherein said chamber comprises jet orifices passing through said rigid spherical concave inner surface for holding said nozzles and discharge ports passing through said rigid spherical concave inner surface for allowing said fluid material to be discharged from said chamber,
wherein a sum of cross-sectional areas of said discharge ports is greater than a sum of cross-sectional areas of said nozzles, and wherein positions where said discharge ports are placed keep said fluid material inside said chamber when said fluid shockwave reactor is at work,
wherein a mid-point between said pair of nozzles resides at a center of said rigid spherical concave surface thereby allowing two flows of said fluid material injected by said pair of nozzles to collide at said center of said rigid spherical concave surface, create shockwaves thereby allowing ultrafine crushing of said fluid material.

2. The fluid shockwave reactor of claim 1, wherein said fluid material further comprises solid particles.

3. The fluid shockwave reactor of claim 1, wherein said reactor comprises multiple sets of pair of nozzles in which axes of the nozzles are not mutual-vertical.

4. The fluid shockwave reactor of claim 1, wherein said shockwave resonance energy concentration device is a symmetric confocal resonant chamber.

5. The fluid shockwave reactor of claim 4, wherein said reactor comprises three pairs of nozzles in which axes of the nozzles are evenly distributed on the same plane and the angle between every two of the axes is 60°.

6. The fluid shockwave reactor of claim 5 further comprising a symmetric torque variable frequency tuning device.

7. The fluid shockwave reactor of claim 6 further comprising a vortex evenly-feeding chamber, a slotted self-servo diversion chamber, and a symmetric coupled deceleration passage.

8. The fluid shockwave reactor of claim 7, wherein said nozzles and said chamber are made of ceramic.

9. The fluid shockwave reactor of claim 8 further comprising a feeding channel and a discharging channel disposed at said feeding channel and said discharging channel.

10. The fluid shockwave reactor of claim 1, wherein said shockwave resonance energy concentration device is a spherical resonant chamber.

11. The fluid shockwave reactor of claim 8, wherein said nozzles have high pressure seals.

12. The fluid shockwave reactor of claim 8, wherein said chamber is a curved surface reflection chamber.

13. The fluid shockwave reactor of claim 1,
wherein the shockwaves form disc-shaped scattering flows of said fluid material from said center to said rigid spherical concave inner surface, and after hitting said rigid spherical concave inner surface, pass through said discharge ports.

14. A fluid shockwave reactor comprising:
a shockwave resonance energy concentration device comprising a chamber having a rigid convergent curved surface such that shockwaves emitted from a convergent focus of said rigid convergent curved surface are reflected by said chamber and then converged to said convergent focus again to produce new shockwaves;
at least a pair of coaxial and opposite nozzles for injecting a fluid material into said chamber with an initial pressure,
wherein said chamber comprises jet orifices passing through said rigid convergent curved surface for holding said nozzles and discharge ports passing through said rigid convergent curved surface for allowing said fluid material to be discharged from said chamber,
wherein a sum of cross-sectional areas of said discharge ports is greater than a sum of cross-sectional areas of said nozzles, and wherein positions where said discharge ports are placed keep said fluid material inside said chamber when said fluid shockwave reactor is at work,
wherein a mid-point between said pair of nozzles resides at said convergent focus of said rigid convergent curved surface, thereby allowing two flows of said fluid material injected by said pair of nozzles to collide at said convergent focus of said rigid convergent curved surface, create shockwaves, said shockwaves emitted from said convergent focus of said rigid convergent curved surface are reflected by said chamber and then converged to said convergent focus again to produce new shockwaves, thereby allowing ultrafine crushing of said fluid material.

15. The fluid shockwave reactor of claim 14, wherein said reactor comprises multiple sets of pair of nozzles in which axes of the nozzles are not mutual-vertical.

16. The fluid shockwave reactor of claim 14, wherein said reactor comprises three pairs of nozzles in which axes of the nozzles are evenly distributed on the same plane and the angle between every two of the axes is 60°.

17. The fluid shockwave reactor of claim 14 further comprising a symmetric torque variable frequency tuning device.

18. The fluid shockwave reactor of claim 14 further comprising a vortex evenly-feeding chamber, a slotted self-servo diversion chamber, and a symmetric coupled deceleration passage.

19. The fluid shockwave reactor of claim 14, wherein said nozzles have high pressure seals.

\* \* \* \* \*